J. WAITE.
Car-Couplings.
No. 142,750.  Patented September 9, 1873.
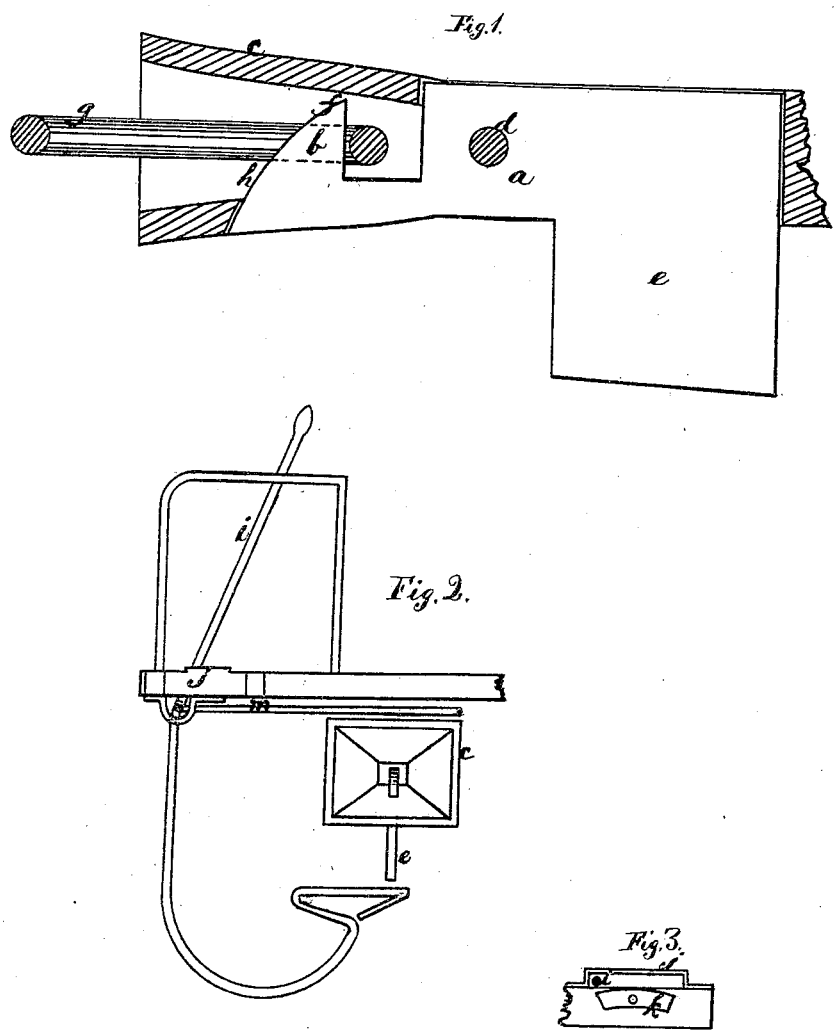

UNITED STATES PATENT OFFICE.

JOSHUA WAITE, OF YARMOUTH, MAINE.

IMPROVEMENT IN CAR-COUPLINGS.

Specification forming part of Letters Patent No. 142,750, dated September 9, 1873; application filed March 1, 1873.

*To all whom it may concern:*

Be it known that I, JOSHUA WAITE, of Yarmouth, in the county of Cumberland and State of Maine, have invented certain new and useful Improvements in Car-Couplings; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1 shows a side sectional elevation; Fig. 2, an end view, showing the lever for operating the hook. Fig. 3 is a view of the catch for fastening the lever.

Same letters show like parts.

My invention consists in a car-coupling of that kind which is capable of coupling automatically, and of certain devices for operating the hook when it is desired to release the link.

$a$ shows a lever or arm, with a hook, $b$, on the front end. This lever is hung in a slot in the draw-head $c$, so that it can move vertically in the slot. This arm or lever tips on the pivot $d$, which passes through the walls of the draw-head from side to side. The rear end of the lever has the plate $e$, so as to weight the lever and keep the point $f$ of the hook pressed up against the upper part of the opening of the draw-head, and thus keep the link securely held in the draw-head. I employ a link of common form, $g$.

The operation of the coupling is simple. The hook part is in such position as to present the inclined edge $h$ to the link as it enters the draw-head. When the link thus enters it presses the hook down, and when the link has passed over the hook the weighted end or plate $e$ restores the hook to the position it was in before it was pressed down.

$i$ is a lever, placed on the front edge of the platform of a car. This extends down under the platform, and is so bent as to have the lower end reach down to the lower edge of the plate $e$. The lower end of the lever is not fastened to the lower edge of the plate, but is only pushed up against it when the same is moved in the proper direction. The vertical or straight part of the lever extends down through the guide $j$. On the top of the platform is the catch $k$. (See Fig. 3.) This catch is to hold the lever in position when so moved that the lower end is pushed up against the plate $e$, and holding it up in order to depress the hook $b$, and unshackle or release the link. Over the top edge of the plate $e$, which is even with the top of the draw-head, is placed the spring $m$, to keep the plate from being thrown up by the motion and jar of the car. This spring or finger can be fastened to the lever $i$, or to the bottom of the car, in any convenient manner. The lever $i$ can have suitable bearings, if desired, on the bottom of the car.

What I claim as my invention, and desire to secure by Letters Patent, is—

The combination of the bent lever $i$, guide $j$, catch $k$, pivoted hooked lever $a\ b$, having the plate $e$, and the spring or finger $m$, as herein set forth, and for the purposes described.

In testimony that I claim the foregoing I have hereunto set my hand.

JOSHUA WAITE.

Witnesses:
  WM. HENRY CLIFFORD,
  ALBERT H. WAITE.